United States Patent [19]

Sautter

[11] Patent Number: 4,558,924
[45] Date of Patent: Dec. 17, 1985

[54] ELECTROCHROMIC INDICATOR DEVICE ASSEMBLED WITH AN ADHESION PROMOTING LAYER

[75] Inventor: Helmut Sautter, Ditzingen, Fed. Rep. of Germany

[73] Assignee: Robert Bosch GmbH, Stuttgart, Fed. Rep. of Germany

[21] Appl. No.: 477,618

[22] Filed: Mar. 22, 1983

[30] Foreign Application Priority Data

Mar. 30, 1982 [DE] Fed. Rep. of Germany ....... 3211651

[51] Int. Cl.⁴ .............................................. G02F 1/23
[52] U.S. Cl. ................................................... 350/357
[58] Field of Search ........................................ 350/357

[56] References Cited

U.S. PATENT DOCUMENTS 4,278,736 7/1981 Kamerling .......................... 350/399
4,396,253 8/1983 Kuwagaki et al. .................. 350/357

FOREIGN PATENT DOCUMENTS 0028147 10/1980 European Pat. Off. ............ 350/357

Primary Examiner—John K. Corbin
Assistant Examiner—Bruce S. Shapiro
Attorney, Agent, or Firm—Frishauf, Holtz, Goodman & Woodward

[57] ABSTRACT

To assure a durable bonded joint between the two substrates on which the respective electrodes of an electrochromic device are joined together by an adhesive to form a cavity between them for an electrolyte, a baked-on layer of polyvinyl alcohol or polyvinyl butyral is provided to promote adhesion, allowing a commercially available two-component adhesive to provide a firm joint even if the non-transparent substrate is of metal. The adhesion promoting coating is also used to line the cavity, except where the electrodes are, thus providing insulation and chemical isolation which is important, at least for the metal substrate. The electrolyte is filled through a hole in the metal substrate, which is thereafter plugged with a low-melting solder. The metal foil of a circuit board can be used to provide the rear portions of a number of electrochromic indicators fitting against a common glass plate if cut-outs are provided in the circuit board into which the metal can be deformed to provide the necessary electrolyte cavities.

20 Claims, 8 Drawing Figures

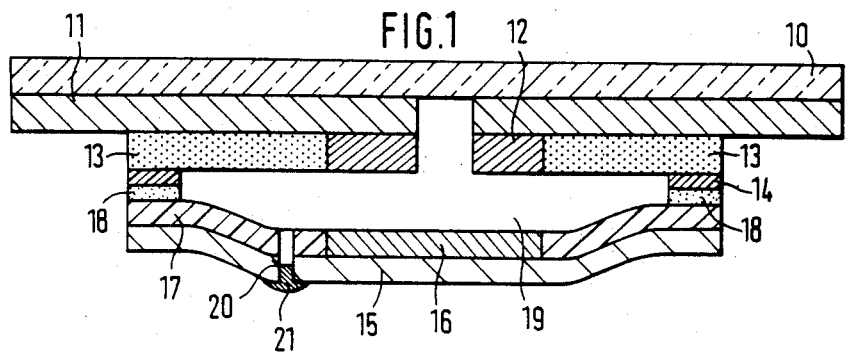
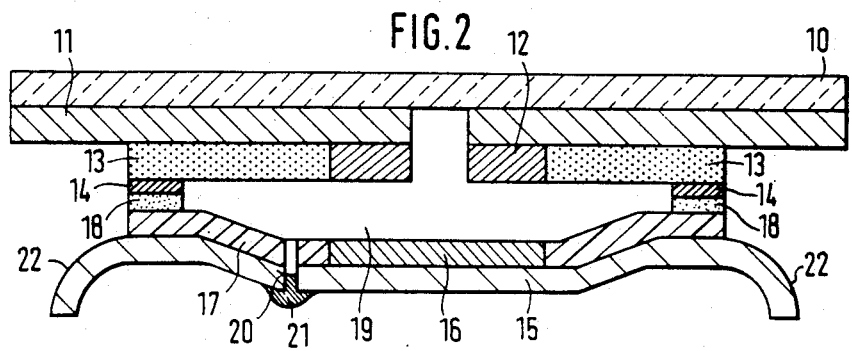
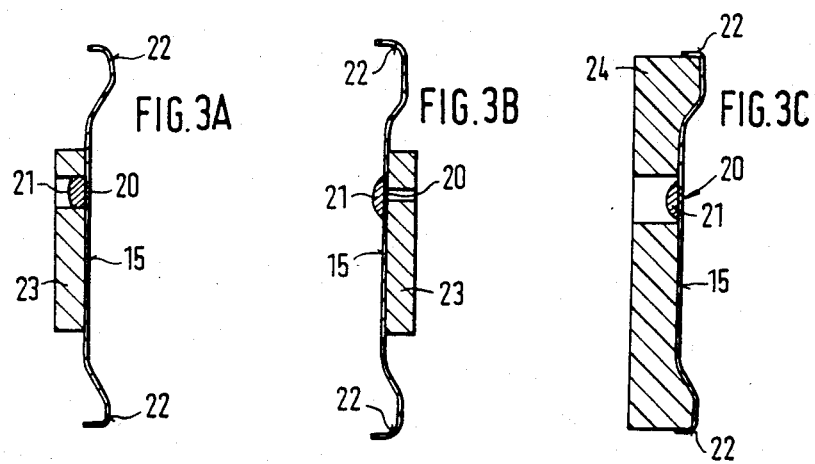

ELECTROCHROMIC INDICATOR DEVICE ASSEMBLED WITH AN ADHESION PROMOTING LAYER

This invention concerns an electrochromic indicating device in which the electrochromic electrode is located on a transparent or translucent substrate, and a counter electrode, which faces the first-mentioned electrode across a small space filled with electrolyte, is mounted on another substrate, preferably of metal, the two substrates being cemented together around their edges.

An indicating device of the type just mentioned is disclosed in German published patent application DE-OS No. 29 02 106. The electrochromic indicating device there shown possesses two glass substrates, one plane and the other dished, between which the electrodes are disposed in a protected manner, cemented together with an adhesive, with the interposition of a sealing element. Such constructions have the disadvantage that they do not become adapted to loads imposed by interior overpressure when temperature fluctuations occur, so that the adhesive bonding locations can loosen or become leaky.

THE INVENTION

It is an object of the present invention to provide a more durable and resistant bonding of the two pieces which enclose the electrolyte in a photochromic cell of the kind used as an indicator.

Briefly, adhesion is promoted by coating at least a rear substrate, which is preferably of metal, with an adhesion promoting layer, typically a polyvinyl compound, which bonds well to the substrate and permits tight sealing when common organic ahdesives are used, especially the durable two-component adhesives.

The invention has the advantage that the adhesive bond between the two substrates is made resistant to the effects of very high temperature fluctuations, obtaining improvements in mechanical, physical, chemical and electrical aspects. From the mechanical point of view, the adhesion promoting layer increases the level of stress loading to which the place of cementing can be subjected and thereby permits to a greater extent the utilization of elastic deformation of the overall system. From the physical point of view, there is a diminution of the permeability of the places where the substrates are cemented together, so that there is no penetration, either of the electrolyte solvents to the outside or of external moisture to the inside of the cell. The adhesion promoting layer, moreover, produces a supplemental smoothing layer on the substrates which improves the electrical insulation and, at the same time, chemically protects the rear substrate of the device against the electrolyte, that substrate being preferably of sheet metal.

The adhesion promoting layer should be applied on the metallic substrate, if such a substrate is used because of its desirable resilient qualities. It is advantageous, however, to apply the adhesion promoting layer of the invention on both interior surfaces of the substrates that are joined together, the adhesion promoting layer preferably covering the entire inner surface of the metallic rear substrate which is exposed to electrolyte, except for the electrode region.

The adhesion promoting layers of the invention can be made of polyvinyl alcohol or its derivatives, or of polyvinyl butyral. The properties of the layer are improved by the use of chromic-phosphoric acid (a mixture of chromic and phosphoric acids) as an additive.

THE DRAWINGS

The invention is further described by way of illustrative examples with reference to the annexed drawings, in which:

FIG. 1 shows schematically a section through an electrochromic indicating device;

FIG. 2 is a section through a modified embodiment of an electrochromic indicating device;

Figure 4:
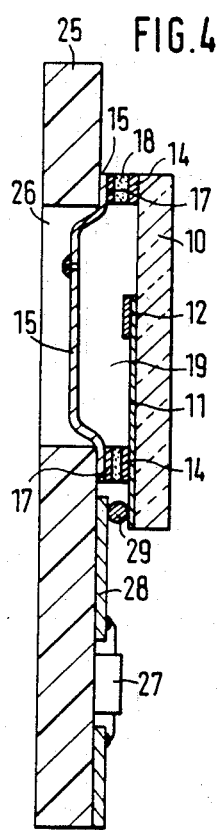
Figure 5A:
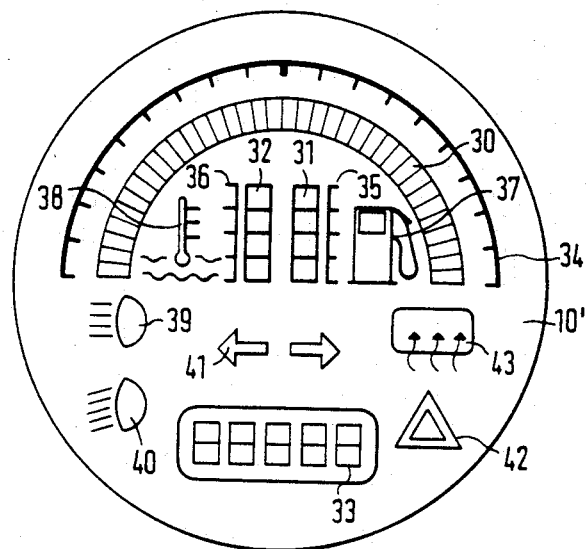
Figure 5B:
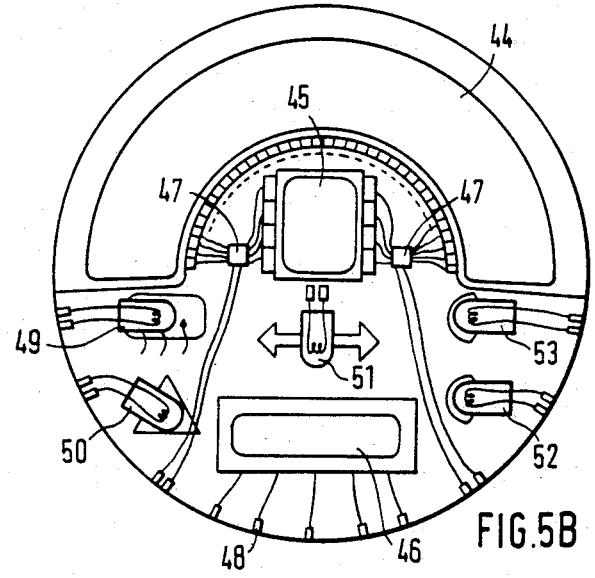

FIGS. 3A, 3B and 3C respectively show different constructions of the rear substrate of the indicating device of FIG. 2;

FIG. 4 is a section of an electrochromic indicator device disposed an an electric circuit board, and FIGS. 5A and 5B are front views of an indicator instrument showing the disposition of a combination of different electrochromic indicating devices on a common front plate.

DESCRIPTION OF THE ILLUSTRATED EMBODIMENTS

FIG. 1 shows a first illustrative embodiment of an electrochromic indicating device. On the side facing the observer, it has a glass plate 10 on the outside serving as a substrate on which first there is a conductive layer 11 for supply of current to the device, and then, on top of that, a layer 12 of transition metal oxide of a contour suitable for providing an image element. A protective layer 13 surrounds the layer 12 on all sides, practically without any intermediate space or gap, covering the conductive layer 11 on the interior of the device. On the protective layer 13 at the outer rim of the indicating device, there is provided an adhesion promoting layer 14 according to the invention. The rest of the construction of the electrochromic indicating device is provided on a second substrate on the side of the device which is more remote from the observer. The second substrate does not need to be transparent or translucent and in the present case consists of a metal plate 15. A counter electrode 16, in the form of a layer, is carried by the metal plate 15 so as to put it opposite the layer 12 and an adhesion promoting layer 17 according to the invention adjoins the counter electrode 16 laterally and provides, at the same time, electrical insulation and chemical isolation for the metal plate 15. The two substrates are bonded to each other by an adhesive 18 which bonds excellently on both sides respectively to the adhesion promoting layers 14 and 17, and thus provides a tight closure for the cell. The interior space of the electrochromic indicating device is filled with an electrolyte 19 which is introduced through a fill opening 20. After the operation of filling with the electrolyte, the opening 20 is sealed shut with a plug of solder 21.

There is a difficulty in the construction of electrochromic indicating devices arising from the fact that the different materials have strongly differing expansion coefficients, so that when there are temperature increases, there arises an internal overpressure in the indicating device, which must be withstood at the places of adhesive bonding 18. This is a problem that is solved by the present invention by the provision of adhesion promoting layers on the surfaces to be cemented with each other, or by providing such an adhesion promoting layer 17 at least on one of the two materials to be bonded togehter which is the less easily held by adhesive. The fact that by the use of the adhesion promoting layer poorer adhesive properties are compensated for can be taken advantage of in the selection of the substrate from other points of view, such as mechanical elasticity, costs, machinability and the like. A rear substrate made of a metal plate 15 has been found particularly effective from the point of view of elasticity and pressure equalization in the cell because the metal plate is easily deformed and thereby contributes to reduction of the inner overpressure. Along with the higher mechanical stability of the place of adhesion, the adhesion promoting layer 17 also provides electrical insulation of the metal plate 15 and chemical protection thereof against attack by the electrolyte. Furthermore, the tightness of the joint is improved so as practically to exclude the possibility of the electrolyte getting through to the outside, and external moisture from getting through to the inside. Unlike the glass plate 10 on the front of the device, the rear side does not need to be transparent or translucent, so that from this standpoint nothing stands in the way of the use of a metal plate 15 for the rear substrate. The conductive layer 11 which provides the current supply for the image element 12, consists of a transparent and electrically conducting layer of indium-tin oxide. The image elements of the layer 12 are made of a layer of transition metal oxide having a thickness from 0.1 to 1 $\mu$m. The transition metal oxide of this layer is preferably $WO_3$ or $MoO_3$.

The shape of the metal plate 15 is produced by pressing or deep drawing into a flat tray or dish. The electrolyte 19 that fills the cavity consists preferably of a 1-molar solution of lithium chlorate, $LiClO_4$, in propylene carbonate which is thickened by additives containing colored pigments. The paste thus produced forms the background for the picture elements 12 and covers the counter electrode 16.

The activation of the electrochromic indicating device is performed by applying a voltage pulse of, e.g. 0.5 to 2 volts and of a pulse duration from 0.1 to 1 second, between the conducting layer 11 and the metal plate 15. An ion transport then takes place in the electrochromic layer 12, the electrolyte 19 and the counter electrode 16. With a negative polarity of the conducting layer 11, an ion migration into the electrochromic layer 12 takes place, as the result of which the coloration of the same takes place. The manufacture of the electrochromic indicating device is carried out in such a way that before the bonding of the glass plate 10 carrying its layers 11 to 13 with the coated metal plate 15, at least the latter is provided with an adhesion promoting layer 17. Preferably the front substrate also is provided with an adhesion promoting layer 14 in the region of the adhesive bonding location 18. The layer 14 can be applied by spraying, spreading, printing or brushing on. The adhesion promoting layers 14 and 17 are baked at a temperature between about 150° C. and 200° C., so that a thin surface capable of good adhesion is formed. Suitable materials for producing the adhesion promoting layers 14 and 17 are, particularly, polyvinyl alcohol and polyvinyl butyral with a supplement of chromium-phosphoric acid. The usually commercially available two-component adhesives can be used for the adhesive 18, which is hardened according to the directions of the manufacturer.

The electrochromic indicating device above described has substantially better mechanical properties of the adhesive joint than are found in conventional cells. In experimental tests, the adhesive joints suffered no damage after a hundred temperature cycles between the extremes of −40° C. and +80° C.

The adhesion promoting layers 14 and 17 lying right against the surfaces to be joined also impede diffusion processes that might go on through the adhesive joint 18, so that the sealing of the cell is improved. Furthermore, the electrical insulation between the electrodes of the cell is more reliable as a result of the adhesion promoting layer. The adhesion 18 needs to be utilized only in a thickness of about 10 $\mu$m in order to provide a good seal.

Especially when a metal plate 15 is used for the rear substrate, the adhesion promoting layer 17 smooths out small unevennesses of the surface of the metal plate, so that supplementary operations such as polishing of the surface are made unnecessary while, all the same, an excellent insulation is obtained. Since the adhesion promoting layer 17 reaches laterally all the way to the counter electrode 16, the chemical isolation provided by the layer is also used.

By the provision of the metal plate 15 in the shape of a flat tray, a high elasticity of the thin metal plate is obtained at the same time as an adequate stability thereof. The thickness of the metal plate can be made less than 0.5 mm and preferably either sheet copper or stainless steel sheet serves as the material. Both of these materials are well worth the moderate price and easy to work. In combination with the adhesion promoting layer, they meet the full range of the required properties. The thickness of the adhesion promoting layers 14 and 17 lies in the region equal to or below 10 $\mu$m, preferably in the region equal to or below 5 $\mu$m, while the adhesive 18 is applied at a thickness equal or below 20 $\mu$m. The glass plate 10 has a thickness of 1.5 to 3 mm, while the conductive layer 11 is about 0.15 $\mu$m thick.

FIG. 2 shows a special configuration of the electrochromic indicating device, with the same parts being designated with the same reference numerals as in FIG. 1. The difference from the arrangement of FIG. 1 lies in the shape of the metal plate 15, of which the rim 22 now no longer terminates at the locations 18, but extends outward past these and is bent away from the place of bonding. Although the adhesion promoting layer 14 and 17 already represent good insulation between the conductive layer 11 on the glass plate 10 and the metal plate 15, by the configuration shown in FIG. 2 there is also provision for elimination of the danger of short-circuits caused by the formation of burrs at the edges of the metal plate 15. Such burrs, produced in the manufacture of the metal plate 15, if they protrude towards the glass plate 10, can penetrate through the adhesion promoting layers 14 and 17 and cause short-circuits. In the case of the configuration of FIG. 2 the necessity for a careful deburring of the metal plate 15 is eliminated, since such short-circuits are prevented by the bent-out rim along the edge 22.

FIG. 3 shows different possible configurations of the metal plate 15 with the use of typical machining and reinforcing processes. The stresses arising by thermal mismatches in the indicating device can best be taken up by a metal plate 15 which is as thin as possible. In such a case, however, problems arise with the shape stability of the flat bottom of the metal plate, on account of which at least in this region stiffening is desirable. In the arrangement according to FIG. 3A, a thicker and smaller metal plate 23 is bonded by adhesive, soldered on or welded on to the outside of the metal plate 15. In the arrangement of FIG. 3B, such a thicker and smaller metal plate 23 is similarly attached to the inside of the plate 15. If this stiffening is provided on the outside, as shown in FIG. 3A, the plate 23 might also be of plastic, if the electrical contacting is made outside of this region. In the embodiment according to FIG. 3C, a plastic layer 24 is applied to the exterior side of the metal plate 15. For this purpose, a premanufactured plastic part can be used or a plastic layer can be sprayed onto the metal plate 15.

The closing of the fill opening 20 for the electrolyte 19 in these cases is provided as in the previously described embodiments, by a plug 21 of soft solder. A low soldering temperature is advantageous in order that the vapor pressure of the electrolyte 19 may remain small, and no damage to the indicator device be produced. It is therefore preferred to use as the solder a mixture of 52% indium and 48% tin, by weight. The soldering temperature in this case is 120° C.

FIG. 4 shows an electrochromic indicating device of the construction previously described which forms part of an electric circuit board 25. In a cut-out 26 of the circuit board 25, the rear wall of the electrochromic indicating device is seated, the metal lamination of the circuit board being used as the metal plate 15 in this case. The metal lamination is pressed inward in the cut-out 26 in order to obtain the dished shape corresponding to the shape of the metal plate 15 in the previously described embodiments. In this manner, a combination of the electrochromic indicating device with parts of the control electronics 27 is obtained by simple means. The circuit board 25, e.g., a plate of glass-fiber-reinforced epoxy material, is provided, before lamination with sheet copper, with the cut-outs 26 at the locations at which later the electrochromic indicating system is to be seated. After lamination, both the structure of the conducting paths 28 of the control circuit and the external form of the rear wall of the indicating device are etched out of the copper layer. The connection with the conducting layer 11 of the indicating device can be made by conductive bridges 29.

The configuration explained with reference to FIG. 4 is particularly advantageous if a number of indication fields are to be brought together on a common transparent or translucent plate 10, as is shown in FIG. 5A. The rear sides of the individual electrochromic indicating devices are covered by individual substrates. Several indicators are arranged on the front glass plate 10', to wit, a semicircular indicator 30, two linear bar indicators 31 and 32, a numerical indicator 33 and scales 34,35 and 36 for the bar indicators. There are also unilluminated fixed symbols 37 and 38 on the glass plate 10', as well as transparent symbol windows 39 to 43 which can be illuminated. An opaque print on the glass plate 10' goes all around the indicator fields, scales and symbols. The scales and fixed symbols 34 to 38 are produced by a second print which is clearly distinguished from the previously applied opaque print forming the background. The symbols 39 to 43 that can be illuminated are represented by openings which, in some cases, are filled in with transparent color.

FIG. 5B shows the rear side of the electrochromic indicating device of FIG. 5A. The indicator fields 32,33 are covered by metallic rear plates 44 to 46. The shape of the rear side plate 44 that deviates from the rectangular form shows the variety of the shape possibilities for the indicating device of the invention. The connecting leads between the image elements and the semiconductor components 47, which are shown only in part, are metallized, as are also the contact surfaces 48 and the attachment points for soldering the lamps 49 to 53 which illuminate the symbol windows 39 to 43 from behind. This variety of configuration possibilities is obtained by virtue of the features of the invention.

Improved constructions of the counterelectrode and the provision of a reflecting background layer for an electrochromic indicating device of this invention are respectively disclosed in applications in which I have joined with others and which are owned by the assignee of this application, all claiming the same priority date, Ser. Nos. 477,616 and 478,271 filed Mar. 22, 1983, and Mar. 25, 1983, the contents of which are incorporated herein by reference.

Examples of compositions preferred for the adhesion promoting layer of the present invention are as follows:

EXAMPLE 1

Polyvinyl alcohol: 100 g
Chromic Acid: 1.2 g
Phosphoric Acid: 1 g

EXAMPLE 2

Polyvinyl butyral: 100 g
Chromic Acid: 0.6 g
Phosphoric Acid: 0.5 g

The chromic and phosphoric acids are first mixed and then added to the polyvinyl alcohol or butyral.

The range of percentage by weight of the chromic-phosphoric acid in the layer material extends up to about 3% by weight. Preferably it is between 0.5 and 2% by weight.

I claim:

1. Electrochromic indicating device comprising:
   first and second electrodes facing each other across a cavity filled with an electrolyte, said first electrode being composed of an oxide of a transition metal and supported by a surface of a transparent or translucent substrate wherein a conducting layer is interposed between said first electrode and said substrate for supply of current to said first electrode and a protection layer is provided on said conducting layer, surrounding said first electrode and on a region not covered by said first electrode, said second electrode being a counter electrode provided as a layer on a second substrate which is a metallic substrate, said substrates being joined together around said electrolyte-filled cavity by an adhesive bonding material applied in a region between said protection layer and said metallic substrate, said device further comprising:
   an adhesion-promoting layer (14, 17) consisting essentially of at least one substance selected from a group which consists of polyvinyl alcohol and polyvinyl butyral and applied on at least a surface of the metallic substrate in the region where the substrates are to be bonded with each other, said adhesion promoting layer being interposed at least between the metallic substrate upon which it is applied and a film of the adhesive bonding material (18) applied between the substrates for bonding them together.

2. Indicating device according to claim 1 in which said adhesion promoting layer (17) extends over the entire interior surface of said metallic substrate not covered by said counter electrode (16) and adjacent to said cavity filled with electrolyte.

3. Indicating device according to claim 1, in which said adhesion promoting layer (14, 17) is also provided between said adhesive bonding material and said protection layer in the region where the substrates are to be bonded together.

4. Indicating device according to claim 1, in which said at least one said substance of said adhesion promoting layer (14,17) is polyvinyl alcohol.

5. Indicating device according to claim 4, in which said adhesion promoting layer (14,17) contains an addition of chromic-phosphoric acid.

6. Indicating device according to claim 5, in which said adhesion promoting layer is in a state producible by baking it onto the substrate on which it is applied, at a temperature in the range from 150° to 200° C.

7. Indicating device according to claim 1, in which said at least one substance of said adhesion promoting layer (14,17) is polyvinyl butyral.

8. Indicating device according to claim 7, in which said adhesion promoting layer (14,17) contains an addition of chromic-phosphoric acid.

9. Indicating device according to claim 8, in which said adhesion promoting layer is in a state producible by baking it onto the substrate on which it is applied, at a temperature in the range from 150° to 200° C.

10. Indicating device according to claim 1, in which said adhesion promoting layer is in a state producible by baking it onto the substrate on which it is applied, at a temperature in the range from 150° to 200° C.

11. Indicating device according to claim 1, in which said adhesive bonding material (18) is a two-component adhesive.

12. Indicating device according to claim 1, in which said metallic substrate has elasticity for allowing said cavity to be deformed as the result of thermal stresses.

13. Indicating device according to claim 12, in which said metallic substrate has a flat planar surface with raised edges such that the edges lie in a plane parallel with said surface, at which edges said first and second substrates ae in a planar joint bonded by said adhesive.

14. Indicating device according to claim 13, in which said raised edges of said metallic substrate have outwardly extending rims bent back away from said parallel plane.

15. Indicating device according to claim 1, in which said metallic substrate is reinforced in a mid-region by a metal plate (23) of smaller contour size.

16. Indicating device according to claim 1, in which said metallic substrate (15) has an opening therethrough for filling said electrolyte (19) in said cavity, and said opening is closed by a plug.

17. Indicating device according to claim 16, in which said plug (21) closing said opening is a soft solder plug.

18. Indicating device according to claim 1, in which said metallic substrate is reinforced by a plastic body on its outer side.

19. An electrochromic indicating device comprising a first substrate which is transparent, to which a plurality of individual metallic substrates each shaped for providing a cavity between itself and said first substrate are bonded in a same plane of bonding by means of an organic adhesive material, a conducting layer on top of said fist substrate and an electrochromic electrode on top of said conducting layer, wherein said electrochromic electrode faces into the cavity provided by each of said metallic substrates, and a counter electrode being provided on each of said metallic substrates facing a corresponding electrochromic electrode, at least said metallic substrates, except where said counter electrode is located thereon, having on their surfaces facing said first substrate a coating of an adhesion promoting material consisting essentially of at least one substance, said one substance being selected from the group consisting of polyvinyl alcohol and polyvinyl butyral.

20. Indicating device according to claim 19, in which said individual metallic substrates are parts of an etched metal foil lamination of a printed circuit board and are respectively seated in cut-outs of said printed circuit board.

* * * * *